United States Patent [19]

Baksa et al.

[11] Patent Number: 4,486,393
[45] Date of Patent: Dec. 4, 1984

[54] PROCESS FOR THE REDUCTION OF THE SODIUM HYDROXIDE LOSSES OF THE BAYER-TYPE ALUMINA PRODUCTION

[75] Inventors: György Baksa; József Boros, both of Ajka; Gyula Horváth, Budapest; Balázs Ihász, Ajka; Zoltán Pais, Ajka; Mátyás Rainiss, Ajka; Ferenc Sitkei, Ajka; Károly Solymár, Budapest; Béla Tóth; Ferenc Valló, Ajka; István Vörö, Budapest; Mária Orbán nee Kelemen, Budpaest; József Zöldi, Budapest, all of Hungary

[73] Assignee: Magyar Aluminiumipari Tröszt, Budapest, Hungary

[21] Appl. No.: 469,140

[22] Filed: Feb. 23, 1983

[30] Foreign Application Priority Data

Feb. 26, 1982 [HU] Hungary ............................. 593/82

[51] Int. Cl.³ ............................................... C01F 7/06
[52] U.S. Cl. ..................................... 423/121; 423/127
[58] Field of Search ................................ 423/121, 127

[56] References Cited

U.S. PATENT DOCUMENTS 2,992.893  7/1961  Soudan et al. ...................... 423/121
3,120,996  2/1964  Porter et al. ....................... 423/123
3,210,155  10/1965 Caynolatti et al. ................. 423/121

Primary Examiner—Herbert T. Carter
Attorney, Agent, or Firm—Karl F. Ross; Herbert Dubno

[57] ABSTRACT

The invention relates to a process for the reduction of sodium hydroxide losses of the Bayer-cycle by modified causticization of red mud which comprises subjecting an optionally previously concentrated red mud slurry led off from the red mud washing line by ramification and containing a liquid phase which has a concentration of 5–40 g. caustic $Na_2O/l$. causticization by adjusting the lime content expressed as CaO through addition of lime or lime milk to 1–3.2 moles per mole $Al_2O_3$, preferably to 2–2.5 moles per mole $Al_2O_3$, related to the total $Al_2O_3$ content of the slurry;

stirring the slurry for 0.3–5 hours at a temperature of 70°–110° C., preferably at 80°–100° C.;

adding to the slurry 3–4 moles, preferably 3.2–3.4 moles, of soda related to 1 mole of the originally dissolved $Al_2O_3$, and continuing the stirring for 1–4 hours at 80°–100° C., preferably at a temperature of 90°–95° C.;

if necessary causticizing the excess of soda by adding lime or lime milk by methods known per se;

if desired concentrating the slurry thus obtained and re-introducing the liquid phase thereof to the red mud washing unit which corresponds to the sodium hydroxide content thereof;

and re-entering the slurry to the red mud washing line.

The advantages of the process of the present invention are as follows: the sodium hydroxide losses of different origin of Bayer-type alumina production are recovered by a single operation step, the process is simple, requires no expensive equipment and is economical.

7 Claims, 1 Drawing Figure

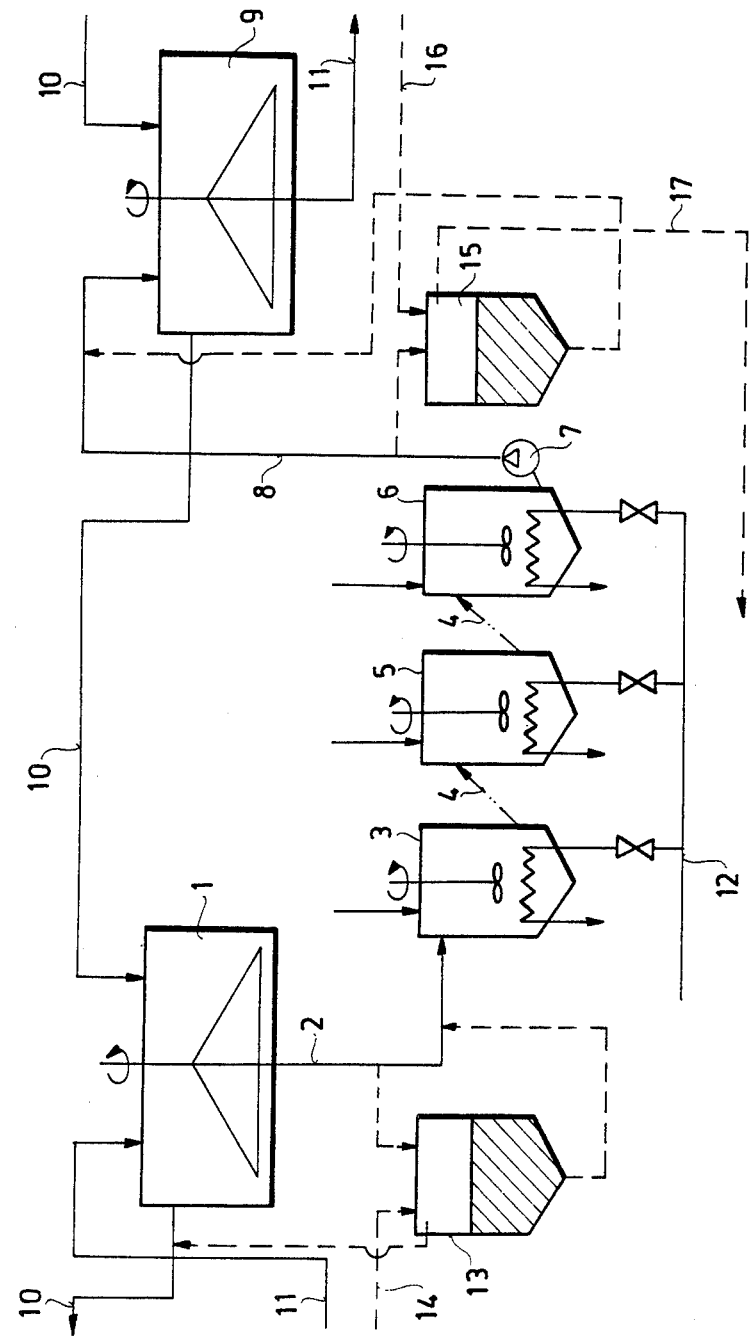

4,486,393

PROCESS FOR THE REDUCTION OF THE SODIUM HYDROXIDE LOSSES OF THE BAYER-TYPE ALUMINA PRODUCTION

FIELD OF THE INVENTION

This invention relates to the reduction of the sodium hydroxide losses in Bayer-type alumina production, processes and more particularly to the Bayer cycle, in a single operation step.

BACKGROUND OF THE INVENTION

The Bayer-type alumina manufacturing process where the aluminum oxide content of bauxite is recovered with the aid of a digesting liquor containing sodium hydroxide.

A significant part of the production cost of alumina (about 15–25%) is due to the price of sodium hydroxide introduced into the Bayer-cycle in order to supplement the sodium hydroxide losses of the cycle. For this reason the reduction of the caustic soda losses and the highest and most efficient recovery of caustic soda from the sodium compounds formed during the process constitutes a constant aim of alumina factories.

The larger part of the sodium hydroxide loss is generally due to the so-called "bound" loss which depends on the amount of the sodium aluminum hydrosilicates formed from the reactive silicon oxide content of bauxite and on the amount of sodium titanates formed during digestion from the titanium oxide content of bauxite, respectively. The said compounds are carried to the dumping place together with the red mud.

Further sodium hydroxide losses are due to the so-called "dissolved" losses derived from the incomplete washing of red mud. These losses arise from the sodium hydroxide adherent to the red mud which leaves the cycle at the end of the red mud washing line together with the mud.

The active, so-called caustic sodium hydroxide content of the Bayer-cycle, which is effective from the point of view of the dissolving of aluminum oxide, is further decreased by the presence of carbonate type minerals in the bauxite; said minerals convert sodium hydroxide into sodium carbonate during the digestion of bauxite.

The carbonate content of bauxite is generally present in the form of calcite ($CaCO_3$), dolomite [$CaMg(CO_3)_2$] and siderite ($FeCO_3$).

Under the digestion conditions used [210°–250° C., 140–250 g/l of $Na_2O_k$—the formula $Na_2O_k$ designates the caustic sodium hydroxide content, expressed as $Na_2O$] the percentual dissolving of calcite amounts to 70–90% and that of dolomite to 80–100%.

Further sources of carbonate formation, while being of minor importance but not neglectable, are the organic substance content of bauxite, the carbon dioxide content of air, the flocculating agents, etc. From these substances sodium carbonate is formed in the digestion liquor.

In order to reduce the above sodium hydroxide losses several processes have been developed which have partly been used on an industrial scale, too. A common feature of these processes is that they are directed to the reduction of only one source of loss, i.e. either to the "bound" losses of the solid phase of red mud, or the "dissolved" loss or the "salt" loss (the amount of sodium hydroxide rmoved with the precipitated soda salt or vanadium salt).

The following methods are used for the reduction of the losses of sodium hydroxide bound in the solid phase of red mud:

Digestion by using an additive. According to this process additives or catalysts are added to the bauxite or the slurry to be digested. Burnt lime is the most well-known additive. According to a recent method iron-containing hydrogarnet is used as catalyst, which promotes the goethite-hematite conversion during digestion and posseses several advantages in the processing of bauxites containing goethite (increase of the alumina yield, technological advantages etc.). This process is disclosed in U.S. Pat. No. 4,091,071.

Causticization of red mud. According to this process lime milk is added to the washed red mud slurry, the mixture is heated for several hours, and the liquid phase is separated from the solid phase, generally by filtration. The diluted alkali solution thus obtained is introduced to one of the washing stages and the mud is led into a receiver.

According to Hungarian U.S. Pat. No. 149,730 red mud is treated with burnt lime and a mixture of sodium hydroxide and sodium carbonate under pressure at a temperature of 140°–200° C.

In order to reduce the "dissolved" losses on the red mud settling and washing lines in the underflower of the settling apparatuses the concentration of the solid substance is increased e.g. by adding synthetic sedimentating agents and the diluted sodium aluminate solution leaving the apparatus together with the red mud is recycled in a suitable manner after separation.

The following methods are used to decrease the amount of sodium carbonate being enriched in the cycle and to regenerate the sodium hydroxide from the sodium carbonate:

The soda salt separated from the recycled digestion liquor by filtration or centrifuging is treated with lime milk, whereafter the thus obtained alkali having a concentration of 40–100 g/l $Na_2O$ is evaporated or introduced into the washing line.

According to a process in widespread use the alkali stream derived from one of the washing apparatuses is treated with calcium hydroxide. Thus, the dissolved sodium carbonate is converted into sodium hydroxide (U.S. Pat. No. 3,120,996).

The above procedures are more or less suitable for the reduction of the losses of "dissolved" and "bound" sodium hydroxide and for the regeneration of soda.

According to the additive-type digestion process used for the reduction of losses of "bound" sodium hydroxide only about 10–15% of the "bound" sodium hydroxide losses can be recovered because if a larger amount of calcium oxide is added during digestion, calcium aluminium hydrosilicates of unfavourable composition (low $SiO_2$-content) are formed which gives rise to secondary alumina oxide losses.

The causticization of red mud might enable the recovery of 70–80% of the "bound" $Na_2O$ content; however 30–50% of the chemically recovered sodium hydroxide leaves the Bayer-cycle together with the filtered red mud. A further drawback of the causticization of red mud is that expensive filtration equipment and additional labor are required.

Causticization of red mud under pressure is used nowhere in practice because of the high energy demand and expensive apparatus required.

According to general practice the recovery of Na$_2$O bound in the red mud and that of inactive Na$_2$O enriched in the solution are carried out in separate operation steps.

OBJECT OF THE INVENTION

The object of the present invention is to provide an improved process for reducing NaOH losses and combine two hitherto independent steps in an industrial scale manufacturing process.

SUMMARY OF THE INVENTION

It has been found that the sodium hydroxide losses of the Bayer-type alumina production can be efficiently reduced to a significant extent by carrying out the causticization of red mud not as a separate operation but during the Bayer-type cycle and together with the regeneration of sodium carbonate.

The present invention is based on the recognition that if lime is added to a sodium aluminate solution under and within a certain concentration and temperature range, no hydrogarnet type compound of the composition of 3CaO.Al$_2$O$_3$.kSiO$_2$(6-2k)H$_2$O but rather a calcium aluminate free of silicic acid and having the composition 3CaO.Al$_2$O$_3$.8H$_2$O is formed. This latter compound reacts with sodium carbonate much more easily than the calcium aluminate of the hydrogarnet type and can be quantitatively regenerated according to the following reaction equation:

$$3CaO.Al_2O_3.8H_2O + 3Na_2CO_3 + nH_2O \rightleftarrows$$
$$3CaCO_3 + 2NaAlO_2 + 4NaOH + (n+6)H_2O$$

According to the present invention causticization of red mud is carried out by subjecting an optionally previously concentrated red mud slurry branched from the red mud washing line and containing a liquid phase which has a concentration of 5–40 g caustic Na$_2$O/l to causticization by adjusting the lime content expressed as CaO through addition of lime or lime milk to 1–3.2 moles per mole Al$_2$O$_3$, preferably to 2–2.5 moles per mole Al$_2$O$_3$, related to the total Al$_2$O$_3$ content of the slurry;

stirring the slurry for 0.3–5 hours at a temperature of 70°–110° C., preferably at 80°–100° C.;

adding to the slurry 3–4 moles, preferably 3.2–3.4 moles, of soda related to 1 mole of the originally dissolved Al$_2$O$_3$, and continuing the stirring for 1–4 hours at 80°–100° C., preferably at a temperature of 90°–95° C.;

if necessary causticizing the excess of soda by adding lime or lime milk by methods known per se;

if desired concentrating the slurry thus obtained and reintroducing the liquid phase thereof to the red mud washing unit which corresponds to the sodium hydroxide content thereof;

and returning the slurry to the red mud washing line.

According to the process of the present invention the slurry used as starting material is diverted from a unit of the red mud washing line, preferably from the underflow of the apparatus. Depending on local technological conditions the complete slurry of the red mud washing apparatus or a part thereof can be processed.

According to the process of the present invention and contrary to the hitherto known methods causticization of red mud is carried out between two units of the washing line. The slurry to be worked up is drained from the apparatus in which the caustic Na$_2$O content of the liquid phase of the slurry amounts to 5–40 g/l or is near to the said interval and is shifted to a value between said limits for the causticification step during the subsequent steps, first of all during the addition of lime milk. In the liquid phase the caustic sodium hydroxide concentration amounts preferably to 10–25 g/l. According to a preferred embodiment the operations of the present invention are carried out between units being as remote from the last washing apparatus as possible.

In some cases it might be preferable to concentrate the slurry prior to causticization. This can be achieved preferably by sedimentation and subsequent decantation. The recovered liquid is re-introduced into the digestion cycle.

The optionally concentrated slurry is led into a heatable receiver equipped with a stirrer and thereafter lime is added. The amount of the lime to be added is determined under taking into consideration the lime content of the slurry and is such that the system should contain 1.0–3.2, preferably 2–2.5, moles of lime per mole Al$_2$O$_3$, related to the total Al$_2$O$_3$ content of the slurry. Burnt or slaked lime can be added to the system but it is preferred to use lime milk. As already mentioned above, the caustic sodium hydroxide content of the liquid phase of the slurry can be adjusted to the desired value by suitable dilution of the lime milk.

The slurry is heated to 70°–110° C., preferably to 80°–100° C., during the adjustment of the lime content or subsequent thereto and is vigorously stirred at this tmperature for 0.5–5 hours. The causticization period takes generally 3–3.5 hours.

Under the concentration conditions discussed above several chemical transformations take place in the slurry which have not been hitherto observed simultaneously. Thus, the entire Al$_2$O$_3$ content of the liquid phase is converted into a compound of the composition 3CaO.Al$_2$O$_3$.8H$_2$O. The Na$_2$CO$_3$ content of the solution reacts with calcium hydroxide according to the following equation:

$$Ca(OH)_2 + Na_2CO_3 = CaCO_3 + 2NaOH.$$

The sodalite and canchrinite type compounds, respectively, which are present in the solid phase and correspond to the composition $$3(Na_2O.Al_2O_3 \cdot 2SiO_2)Na_2X.nH_2O$$

(wherein X is a bivalent anion of a mineral acid, e.g. CO$_3{}^{2-}$ or S$^{2-}$ or two OH$^-$, AlO$_2{}^-$ or Cl$^-$ ions) are transformed in an extent of about 60–80% to compounds of the formula $$3CaO.Al_2O_3 - 1SoP_2 - (6-2k)H_2O$$

(wherein k is 0.6–2, generally about 1.5).

Thereafter soda is added to the slurry in an amount disclosed above in order to decompose the calcium aluminate of the formula 3CaO.Al$_2$O$_3$.6H$_2$O formed during causticization and being capable of regeneration. One may proceed preferably by using for this purpose the soda salt precipitated on the evaporation of the diluted digestion liquor of the Bayer-type cycle. This soda—being up to now a waste product—can be completed with a suitable amount of fresh soda, if necessary.

The recovery with soda is carried out for 1–4 hours, preferably for 2 hours, at a temperature of 80°–100° C., preferably at 90°–95° C. In order to ensure maximal contact of the phases vigorous and intensive stirring is very important, as in the preceeding step.

After decomposition of the calcium aluminate, the excess of soda, which can still be present in the system, is causticized by adding a further amount of lime. This step can be carried out by any known causticization method.

Before the slurry is re-introduced into the red mud washing line it is preferably concentrated again, particularly by sedimentation and subsequent decantation. This operation is particularly useful if the liquid phase contains a relatively high amount of caustic $Na_2O$ because the thus separated alkali can be recycled into a washing unit having identical or similar sodium hydroxide content.

The operation sequence of the present invention can be connected both to closed (with filter) and open (without filter) red mud washing lines. The latter alternative constitutes an important advantage of the present invention. Thus the present invention enables the significant reduction of the sodium hydroxide losses of the Bayer-cycle without using filters.

The complex causticization operation of the present invention is carried out preferably in cascade type tanks consisting of receivers equipped with stirrers. All of the steps of the present invention can also be realized in any suitable equipment generally used in alumina factories.

BRIEF DESCRIPTION OF THE DRAWING

The sole FIGURE of the drawing represents a processing line which is suitable for the process of the present invention.

SPECIFIC DESCRIPTION

Receiver 1 equipped with a stirrer is the $i^{th}$ unit of a red mud washing line consisting of N−3 members. The red mud is transferred into the first member of the cascaded tank reactors consisting of M−2 members (i.e. into apparatus 3) through pipeline 2. The red mud can be concentrated, if necessary, in settling apparatus 13 inserted between the two units with the aid of a sedimentation agent introduced via pipeline 14.

The reactors 3–6 can be heated by steam arriving from pipeline 12 and are equipped with stirrers. The tank reactors are connected with pipelines 4 which serve for the transport of the slurry. The slurry can be transferred from the last unit 6 of the cascade with the aid of pump 7 and pipeline 8 into receiver 9 equipped with a stirrer (i.e. washing stage i+1). Settling apparatus 15 can be inserted, if necessary, in which the red mud can be concentrated with the aid of a sedimentation agent added via pipeline 16. The liquid phase is re-introduced through pipeline 17 into the red mud washing unit whose sodium hydroxide concentration corresponds to the sodium hydroxide content thereof. The $i^{th}$ and $i+1^{st}$ apparatus of the washing line are connected to the $i-1^{st}$ and $i+2^{nd}$ washing units through alkali pipeline 10 and red mud pipeline 11, respectively. The materials can be introduced either batchwise or continuously into any apparatus of the series of reactors consisting of M members. Thus e.g. into apparatus 3 line or lime milk, into the $j^{th}$ member /j−2/ and into apparatus 5 soda salt or, if necessary, lime can be added.

The process of the present invention has several advantages which could not be achieved by the hitherto known methods.

According to the known procedures in the working up of bauxite having a high $SiO_2$ and carbonate content attempts were made to recover the sodium hydroxide content of the red mud, the precipitated soda salt and the non-caustic $Na_2O$ dissolved in the digestion liquor of the cycle by adding lime at different stages of the cycle to different material streams. According to the process of the present invention this is carried out by a single addition of lime.

With the aid of the process of the present invention, contrary to the method described in U.S. Pat. No. 3,120,996, both the $Na_2O$ bound in the red mud and also the sodium content of the soda salt necessarily separated from the cycle are recovered.

In conventional red mud causticization the significant $Al_2O_3$ losses cause large problems. This drawback can be reduced by the process of the present invention to a significant extent. Further advantages of the present invention are that the process is simple, it can be carried out in simple equipments, no separate handling labour is required and the maintenance demands are low.

The present invention can be particularly preferably used for the working up of bauxites which contain more than 5% by weight of $SiO_2$ and more than 1% by weight of $CO_2$ bound in the form carbonates because it enables the recovery of 20–50% of the $Na_2O$ losses, as expressed by the specific value of 1.2–2.0 kg CaO/kg of recovered $Na_2O$.

SPECIFIC EXAMPLES

Further details of the present invention are to be found in the following Examples without limiting the scope of the invention to the Examples.

EXAMPLE 1

120 m³ of red mud are taken off the underflow of the fourth washing units of a washing line consisting of 2 settling and 6 washing units.

The composition of the slurry is as follows:
Solid substance content: 300 g./l.
Amount of the solid phase: 36,000 kg.

The composition of the solid phase of the slurry is as follows:

|  | % by weight | kg. |
|---|---|---|
| $Al_2O_3$ | 14.7 | 5 292 |
| $Na_2O$ | 7.5 | 2 700 |
| CaO | 7.2 | 2 592 |
| $SiO_2$ | 13.0 | 4 680 |
| $Fe_2O_3$ | 43.5 | 15 660 |
| $TiO_2$ | 4.8 | 1 728 |
| Heating losses | 7.8 | 2 808 |
| Miscellaneous | 1.5 | 540 |
| Total: | 100.0 | 36 000 |

Amount of the liquid phase: 108 m³.

The $Na_2O_{caustic}$, $Na_2O_{carbonate}$ and $Al_2O_3$ concentrations of the liquid phase are as follows:

|  | g./l. | kg. |
|---|---|---|
| $Al_2O_3$ | 11.8 | 1 274 |
| $Na_2O_{caustic}$ | 15.1 | 1 631 |
| $Na_2O_{carbonate}$ | 3.6 | 389 |

To the slurry having the above composition 60 m³ of lime milk [concentration 100 g. CaO/l.] are added.

After a reaction time of 2 hours /temperature 90° C./ the composition of the solid and liquid phase is as follows:

Volume of the slurry: 180 m³
Weight of the solid phase: 43,300 kg
Solid substance: 240 g./l.
  The composition of the solid phase is as follows:

|  | % by weight | kg. |
|---|---|---|
| $Al_2O_3$ | 15.0 | 6 480 |
| $Na_2O$ | 2.5 | 1 083 |
| CaO | 19.8 | 8 580 |
| $SiO_2$ | 10.8 | 4 680 |
| $Fe_2O_3$ | 36.1 | 15 660 |
| $TiO_2$ | 4.0 | 1 720 |
| Heating losses | 11.0 | 4 751 |
| Miscellaneous | 0.8 | 346 |
| Total: | 100.0 | 43 300 |

Volume of liquid phase 166 m³.
  The composition of the liquid phase is as follows:

|  | g./liter | kg. |
|---|---|---|
| $Al_2O_3$ | 0.4 | 66 |
| $Na_2O_{caustic}$ | 21.6 | 3 585 |
| $Na_2O_{carbonate}$ | 0.5 | 83 |

During this operation step from the red mud 1.617 kg. of bound $Na_2O$ are made free and get into the solution in the form of NaOH; from the $Na_2CO_3$ content of the liquid phase an amount corresponding to 303 kg. of $Na_2O$ is causticized into NaOH and 1.208 kg. of $Al_2O_3$ get into the solid phase, mainly in the form of a compound of the formula $3 CaO.Al_2O_3.8H_2O$.

In order to recover the $Al_2O_3$ precipitated from the liquid phase in the form of calcium aluminate and for the purpose of soda causticization, 30 m³ of a soda salt solution are added to the slurry. The composition of the solution is as follows:

|  | g./l. | kg. |
|---|---|---|
| $Al_2O_3$ | 2.2 | 66 |
| $Na_2O_{caustic}$ | 5.2 | 156 |
| $Na_2O_{carbonate}$ | 73.4 | 2 200 |

After a reaction period of one hour the composition of the reaction mixture is as follows:
Volume: 210 m³
Solid substance: 202 g./l.
Weight of the solid phase: 42,200 kg.
  The composition of the solid phase is as follows:

|  | % by weight | kg. |
|---|---|---|
| $Al_2O_3$ | 12.7 | 5 392 |
| $Na_2O$ | 2.6 | 1 083 |
| CaO | 20.3 | 8 580 |
| $SiO_2$ | 11.0 | 4 680 |
| $Fe_2O_3$ | 36.9 | 15 660 |
| $TiO_2$ | 4.1 | 1 695 |
| Heating losses | 11.2 | 4 800 |
| Miscellaneous | 1.2 | 510 |
|  | 100.0 | 42 400 |

Volume of the liquid phase: 196 m³
  Composition of the liquid phase:

|  | g./l. | kg. |
|---|---|---|
| $Al_2O_3$ | 6.0 | 1 176 |
| $Na_2O_{caustic}$ | 28.7 | 5 625 |
| $Na_2O_{carbonate}$ | 2.0 | 392 |

During the process from the solid phase 1,617 kg. and from $Na_2CO_3$ 2,200 kg. of sodium hydroxide/expressed in $Na_2O$/are recovered.
  Efficiency of causticization for the solid phase:

$$\eta_{caust.} = \frac{2700 - 1083}{2700} \cdot 100 = 59.9\%.$$

The common specific lime consumption for $Na_2O$ recovered from the bound alkali and $Na_2CO_3$ is:

6000/3817 = 1.57 kg. CaO/kg. $Na_2O$

EXAMPLE 2

One proceeds as described in Example 1 except that the slurry of red mud is filtered off, and re-slurried in dump water and the obtained slurry is then entered into the complex causticization procedure. While according to Example 1 98 kg. (1274–1176 kg.) of the $Al_2O_3$ separated from the liquid phase in the form of calcium aluminate are not dissolved in the step of soda treatment and hence leave the system with the red mud as a loss, in the case of this previous concentration the amount of calcium aluminate separated from the liquid phase is smaller and consequently the non-dissolved $Al_2O_3$ loss is reduced to 40 kg. (1274–1234 kg.).

EXAMPLE 3

One proceeds according to Example 1 except that at the end of the complex causticization procedure the red mud slurry is filtered and the solid and liquid phases are introduced to different members of the red mud washing line. In this case a significant part of the digestion liquor of higher concentration (28.7 g./l. $Na_2O_k$) is entered into a (previous) unit of the washing line having a suitable concentration, hence the $Na_2O_k$ concentration of the last units of the red mud washing line is decreased and thus the causticized red mud is washed out in a more profound and complete manner.

We claim:
1. In a Bayer cycle alumina production in which red mud is passed in succession through a series of washers in counterflow to alkali washing liquor, the improvement which comprises reducing sodium hydroxide loss by:
  (a) branching red mud slurry consisting of a liquid phase and a solid phase from one of said washers;
  (b) adding lime milk to said slurry with the liquid phase having a concentration of substantially 5 to 40 grams of caustic $Na_2O/l$ at a rate of substantially 1 to 2.5 moles of CaO per mole of $Al_2O_3$ total in said slurry in the first one of a plurality of cascaded heating units and passing the mixture thus formed from unit to unit along the cascade;
  (c) stirring the slurry as formed in step (b) in at least one of said units for 0.3 to 5 hours at a temperature of 70° to 110° C. and thereafter passing the mixture to a further one of said units of said cascade;
  (d) adding to said slurry 3 to 4 moles of soda per mole of original dissolved $Al_2O_3$ and continuing the stirring of the resulting composition for 1 to 4 hours at a temperature of 80° to 100° C. in at least one unit of the cascade; and (e) recycling at least a portion of the slurry resulting from step (d) to the next of said washers in said line.

2. The improvement defined in claim 1 wherein the stirring is carried out in step (c) at a temperature of substantially 80° to 100° C. and in step (d) at a temperature of 90° to 95° C. and the amount of soda added in step (d) is 3.2 to 3.4 moles per mole of original dissolved $Al_2O_3$.

3. The improvement defined in claim 1, further comprising the steps of:

(f) concentrating the slurry resulting from step (d) to separate a liquid phase thereof containing sodium hydroxide from a red mud concentrate, the red mud concentrate being recycled to the next of said washers in said line in step (e); and (g) delivering the liquid phase separated in step (f) to said line at a washer therealong having a corresponding sodium hydroxide content.

4. The improvement defined in claim 1, further comprising the step of concentrating the branched red mud slurry in step (a) prior to addition of lime milk thereto in step (b).

5. The improvement defined in claim 1 wherein said soda is a soda salt precipitated on evaporation of a diluted digestion liquor of said cycle.

6. The improvement defined in claim 5 wherein said soda salt is complemented with fresh soda for use in step (d).

7. The improvement defined in claim 4 wherein the slurry of step (d) is concentrated in step (f) by sedimentation and decantation.

* * * * *